United States Patent
Khayrallah

(10) Patent No.: US 9,692,622 B2
(45) Date of Patent: Jun. 27, 2017

(54) EQUALIZATION WITH NOISY CHANNEL STATE INFORMATION

(71) Applicant: Telefonaktiebolaget L M Ericsson (publ), Stockholm (SE)

(72) Inventor: Ali S. Khayrallah, Mountain View, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/300,658

(22) Filed: Jun. 10, 2014

(65) Prior Publication Data

US 2015/0358184 A1    Dec. 10, 2015

(51) Int. Cl.
*H03H 7/40* (2006.01)
*H04L 25/03* (2006.01)
*H04L 25/02* (2006.01)

(52) U.S. Cl.
CPC .... *H04L 25/03961* (2013.01); *H04L 25/0242* (2013.01); *H04L 25/03197* (2013.01)

(58) Field of Classification Search
CPC ............... H04L 1/006; H04L 25/03292; H04L 25/0202; H04L 25/03267; H04L 2027/0038; H04L 2025/03426; H04L 25/03305; H04L 27/01; H04L 25/03968; H04L 25/067; H04L 27/38; H03M 13/256; H03M 13/6331

(Continued)

(56) References Cited

U.S. PATENT DOCUMENTS 6,707,849 B1 * 3/2004 Zangi ................ H04L 25/03197
                                                    375/233
6,980,602 B1 * 12/2005 Kleinerman .......... H04L 1/0047
                                                    327/1

(Continued)

OTHER PUBLICATIONS

Generalized map: sequence detection for non-ideal frequency selective channel knowledge: IEEE international conference on acoustis,speech and signal processing, vol. 3. Apr. 15-20, 2007; pp. 469-472.*

(Continued)

*Primary Examiner* — Rahel Guarino
(74) *Attorney, Agent, or Firm* — Withrow & Terranova, PLLC

(57) ABSTRACT

Systems and methods related to improved coherent demodulation and, in particular, improved channel equalization that accounts for variation in an effective channel estimation error with transmitted symbols are disclosed. In one embodiment, a wireless node includes a receiver front-end, a channel estimator, and an equalizer. The receiver front-end is adapted to output samples of a received signal. The channel estimator is adapted to estimate a channel between a transmitter of the received signal and the wireless node based on the samples of the received signal. The equalizer is adapted to process the samples of the received signal according to a modified equalization scheme that compensates for variation in an effective channel estimation error with transmitted symbols to thereby provide corresponding bit or symbol decisions. In this manner, channel equalization is improved, particularly for a wireless system that utilizes a modulation scheme with varying amplitude.

20 Claims, 5 Drawing Sheets

(58) Field of Classification Search
USPC ....... 375/233, 341, 229, 346, 265, 348, 260, 375/316, 232, 299, 262; 714/792, 794, 714/780
See application file for complete search history.

(56) References Cited

U.S. PATENT DOCUMENTS

| | | | |
|---|---|---|---|
| 7,315,578 B2 | 1/2008 | Cheng | |
| 8,116,242 B2 | 2/2012 | Thomas et al. | |
| 2002/0167923 A1* | 11/2002 | Sendonaris | H04L 25/0236 370/335 |
| 2004/0017846 A1* | 1/2004 | Fernandez-Corbaton | H04B 1/7093 375/152 |
| 2009/0052516 A1* | 2/2009 | Chen | H04L 25/0232 375/232 |
| 2010/0248664 A1* | 9/2010 | Dent | H04B 7/0667 455/132 |
| 2010/0248666 A1* | 9/2010 | Hui | H04L 25/0224 455/208 |
| 2010/0266071 A1* | 10/2010 | Chen | H04L 25/03203 375/341 |
| 2011/0207400 A1* | 8/2011 | Tong | H04B 17/3913 455/39 |

OTHER PUBLICATIONS

Duel-Hallen, Alexandra et al., "Delayed Decision-Feedback Sequence Estimation," IEEE Transactions on Communications, vol. 37, No. 5, May 1989, IEEE, pp. 428-436.

Khayrallah, A.S. et al., "Improved Channel Estimation with Side Information," IEEE 47th Vehicular Technology Conference, vol. 2, May 4-7, 1997, Phoenix, AZ, IEEE, pp. 1049-1053.

Ungerboeck, G., "Channel Coding With Multilevel/Phase Signals," IEEE Transactions on Information Theory, vol. 28, Issue 1, Jan. 1982, IEEE, pp. 55-67.

Meyr, Heinrich, et al., "Chapter 12 Detection and Parameter Synchronization on Fading Channels," in Digital Communication Receivers: Synchronization, Channel Estimation, and Signal Processing (book), 1998, John Wiley & Sons, Inc., pp. 631-677.

Sellami, Noura et al., "Generalized Map: Sequence Detection for Non-Ideal Frequency Selective Channel Knowledge," IEEE International Conference on Acoustics, Speech and Signal Processing (ICASSP), vol. 3, Apr. 15-20, 2007, Honolulu, Hawaii, IEEE, 4 pages.

Tüchler, Michael et al., "Equalization for Non-Ideal Channel Knowledge," Conference on Information Sciences and Systems, The Johns Hopkins University, Mar. 12-14, 2003, Baltimore, Maryland, 6 pages.

International Search Report and Written Opinion for International Patent Application No. PCT/IB2015/053343, mailed Sep. 14, 2015, 11 pages.

Advisory Action for U.S. Appl. No. 14/300,673, mailed Feb. 22, 2016, 3 pages.

Benjillali, Mustapha, et al., "On Reliability Metrics for Soft-Input Decoding in Presence of Channel Estimation Errors," IEEE 63rd Vehicular Technology Conference, vol. 5, May 7-10, 2006, IEEE, pp. 2548-2552.

Cavers, James K., "An Analysis of Pilot Symbol Assisted Modulation for Rayleigh Fading Channels," IEEE Transactions on Vehicular Technology, vol. 40, No. 4, Nov. 1991, IEEE, pp. 686-693.

Taricco, Giorgio, "Optimum Receiver Design and Performance Analysis of Arbitrarily Correlated Rician Fading MIMO Channels With Imperfect Channel State Information," IEEE Transactions on Information Theory, vol. 56, No. 3, Mar. 2010, IEEE, pp. 1114-1134.

Wang, Michael Mao, et al., "Soft Decision Metric Generation for QAM With Channel Estimation Error," IEEE Transactions on Communications, vol. 50, Issue 7, Jul. 2002, IEEE, pp. 1058-1061.

Xiao, Weimin, "Optimal Detection of M-QAM Signal with Channel Estimation Error," IEEE International Conference on Communications, vol. 5, May 11-15, 2003, IEEE, pp. 3251-3255.

Non-Final Office Action for U.S. Appl. No. 14/300,673, mailed Jun. 1, 2015, 6 pages.

Final Office Action for U.S. Appl. No. 14/300,673, mailed Nov. 25, 2015, 8 pages.

International Search Report and Written Opinion for International Patent Application No. PCT/IB2015/054244, mailed Aug. 11, 2015, 12 pages.

\* cited by examiner

EQUALIZATION WITH NOISY CHANNEL STATE INFORMATION

FIELD OF THE DISCLOSURE

The present disclosure relates to channel equalization in a wireless receiver.

BACKGROUND

The topic of reliable signal transmission at very low Signal-to-Noise (SNR) has recently become of interest in the context of machine communication in a cellular communications network. For example, an appliance in a home basement would need an extra 20 decibels (dB) of link margin to communicate with an outdoor base station. In the same context, various single carrier narrowband schemes have been proposed, as opposed to, e.g., Code Division Multiple Access (CDMA) or Orthogonal Frequency Division Multiplexing (OFDM). Given the relatively low rates required by the types of machine communication envisioned, the bandwidths considered are in 10's of Kilohertz (KHz) range. For such scenarios, Inter-Symbol Interference (ISI) due to channel dispersion can be significant. Other causes of ISI include partial response signaling at the transmitter, and transmit and receive filtering. These various causes of ISI are all modeled as part of the ISI channel, and channel equalization is needed at the receiver.

When using a pilot-assisted demodulation scheme (i.e., coherent demodulation), a transmitter embeds known pilot symbols in the transmitted signal. Then, at the receiver, a channel estimation process exploits the known pilot symbols to estimate a channel between the transmitter and the receiver (i.e., estimates the channel coefficients). A channel equalization scheme then utilizes the channel estimate to provide resulting bit or symbol decisions. In general, the quality of the channel estimation increases as the amount of resources of the transmitter that are dedicated to the known pilot symbols increases. The resources of the transmitter include the number of symbols allocated as pilot symbols and/or the power allocated to the transmission of the pilot symbols. Thus, there is a tradeoff between the quality of the channel estimation and the amount of resources of the transmitter that can be allocated to carry information. Specifically, a symbol can allocated to either: (a) carry information which, for instance, enables a lower rate, more robust error control code, or (b) carry a known pilot symbol, which boosts channel estimation quality. Since the transmitter has a limited amount of resources, as the number of known pilot symbols transmitted increases, the amount of resources available for transmitting information decreases.

One issue that arises, particularly in the machine-type communication example mentioned above, is reliable communication in a low SNR scenario. Here, SNR is from the perspective of the signal, while reliability or performance is from the perspective of the bits. That is, SNR is the ratio of signal power to noise power, and performance is the bit or block error rate. From this perspective, given a modulation choice, e.g., Quadrature Phase Shift Keying (QPSK) or 16 Quadrature Amplitude Modulation (16-QAM), and a certain fixed SNR, suppose that the performance is unreliable. Then, one way to boost performance at a fixed SNR is to accumulate more energy per bit. The straightforward way to accumulate energy is via repetition, taken in the wide sense to include repetition in time, frequency, or across receive antennas. All of these repetition schemes fit under a Single Input Multiple Output (SIMO) model, which usually involves multiple receive antennas. Energy accumulation can also be achieved with coding, which complements repetition. For instance, coding may be embedded with modulation such as in, for example, trellis coded modulation.

Traditionally, most wireless communications systems are designed such that the quality of the channel estimation is very high. As a result, at the receiver, the Channel State Information (CSI), and in particular the channel estimate, can be treated as essentially noiseless. However, going forward, it may be beneficial to shift the design towards better, more robust error control coding in order to improved reliability (e.g., in low SNR scenarios), at the price of fewer known pilot symbols and thus a noisier CSI. As such, there is a need for systems and methods for improved coherent demodulation in the presence of noisy CSI. Further, there is a need for systems and methods for improved channel equalization in the presence of noisy CSI.

SUMMARY

Systems and methods related to improved coherent demodulation and, in particular, improved channel equalization that accounts for variation in an effective channel estimation error with transmitted symbols are disclosed. In one embodiment, a wireless node includes a receiver front-end, a channel estimator, and an equalizer. The receiver front-end is adapted to output samples of a received signal. The channel estimator is adapted to estimate a channel between a transmitter of the received signal and the wireless node based on the samples of the received signal. The equalizer is adapted to process the samples of the received signal according to a modified equalization scheme that compensates for variation in an effective channel estimation error with transmitted symbols to thereby provide corresponding bit or symbol decisions. In this manner, channel equalization is improved, particularly for a wireless system that utilizes a modulation scheme with varying amplitude.

In one embodiment, the modified equalization scheme is a modified Maximum Likelihood Sequence Estimation (MLSE) scheme. In another embodiment, the modified equalization scheme is a modified Decision Feedback Sequence Estimation (DFSE) scheme.

In one embodiment, the modified equalization scheme is a trellis-based equalization scheme that utilizes a trellis and a branch metric that takes into account variation in the effective channel estimation error with transmitted symbols. In one embodiment, the branch metric is defined as:

$$\mu_{new}(b_{k,j}^{(m)}) = \left(r_k - \hat{r}_{k,j}^{(m)}(b_{k,j}^{(m)})\right)^H R_w^{-1} \left(r_k - \hat{r}_{k,j}^{(m)}(b_{k,j}^{(m)})\right) + \ln(\det(R_w))$$

where $b_{k,j}^{(m)}$ is a j-th fan-in branch of an m-th state $s_k^{(m)}$ in a k-th stage of the trellis, $\mu_{new}(b_{k,j}^{(m)})$ is the branch metric for the j-th fan-in branch $b_{k,j}^{(m)}$ in the trellis, $r_k$ is the received signal at time k, $\hat{r}_{k,j}^{(m)}(b_{k,j}^{(m)})$ is a synthesized receive value for the j-th fan-in branch $b_{k,j}^{(m)}$, H denotes the Hermitian transpose, and $R_w$ is a covariance of the effective channel estimation noise with transmitted symbols conditioned on the j-th fan-in branch $b_{k,j}^{(m)}$. In another embodiment, the branch metric is defined as:

$$\mu_{new}(b_{k,j}^{(m)}) = (\beta(b_{k,j}^{(m)}))^{-1} \|r_k - \hat{r}_{k,j}^{(m)}(b_{k,j}^{(m)})\|^2 + NN_0 \ln(\beta(b_{k,j}^{(m)}))$$

where $b_{k,j}^{(m)}$ is a j-th fan-in branch of an m-th state $s_k^{(m)}$ a k-th stage of the trellis, $\mu_{new}(b_{k,j}^{(m)})$ is the branch metric for the j-th fan-in branch $b_{k,j}^{(m)}$ in the trellis, $r_k$ is the received signal at time k, $\hat{r}_{k,j}^{(m)}(b_{k,j}^{(m)})$ is a synthesized receive value for the j-th fan-in branch $b_{k,j}^{(m)}$, and $\beta(b_{k,j}^{(m)})$ is a term that captures a modulation effect of symbols associated with the j-th fan-in branch $b_{k,j}^{(m)}$ on a covariance of the effective channel estimation noise with transmitted symbols conditioned on the j-th fan-in branch $b_{k,j}^{(m)}$.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
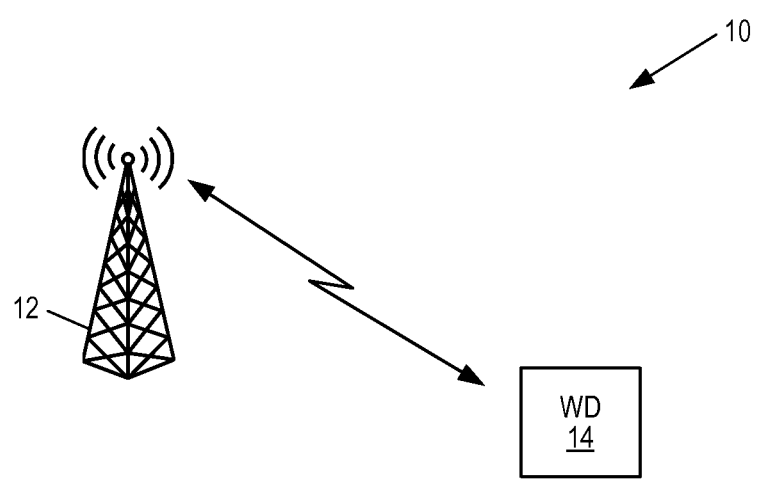
FIG. 1 illustrates on example of a cellular communications network in which a channel equalization scheme that accounts for an effective channel estimation error that varies with transmitted symbols is utilized according to one embodiment of the present disclosure.

Systems and methods for improved coherent demodulation and, in particular, improved channel equalization in the presence of a noisy channel estimate, or more generally a channel estimate having some error, are provided. In this regard, FIG. 1 illustrates one example of a cellular communications network 10 in which a channel equalization scheme that accounts for a channel estimate having some error is utilized according to one embodiment of the present disclosure. As illustrated, the cellular communications network 10 includes a base station 12 that is included in a Radio Access Network (RAN) of the cellular communications network 10 and a wireless device 14 that wirelessly communicates with the base station 12 via an uplink and a downlink. The base station 12 may be any type of base station. For instance, in $3^{rd}$ Generation Partnership Project (3GPP) Long Term Evolution (LTE), the base station 12 may be an evolved, or enhanced, Node B (eNB) or a low-power base station (e.g., a pico base station, a femto base station, a home eNB, etc.). Further, while the base station 12 is illustrated, the embodiments disclosed herein are equally applicable to any type of radio access node.

The wireless device 14 is generally any type of device equipped with a transceiver capable of wireless communication with the base station 12. For example, the wireless device 14 may be a mobile device (e.g., a mobile phone), a Machine Type Communication (MTC) device, or the like. For instance, in 3GPP LTE, the wireless device 14 may be a User Equipment device (UE). Note that the term "wireless node" is used herein to generally refer to any type of device utilizing an embodiment of the coherent demodulation schemes disclosed herein. In other words, in the example of FIG. 1, the term "wireless node" refers to either a radio access node (e.g., the base station 12) or the wireless device 14.

Figure 2:
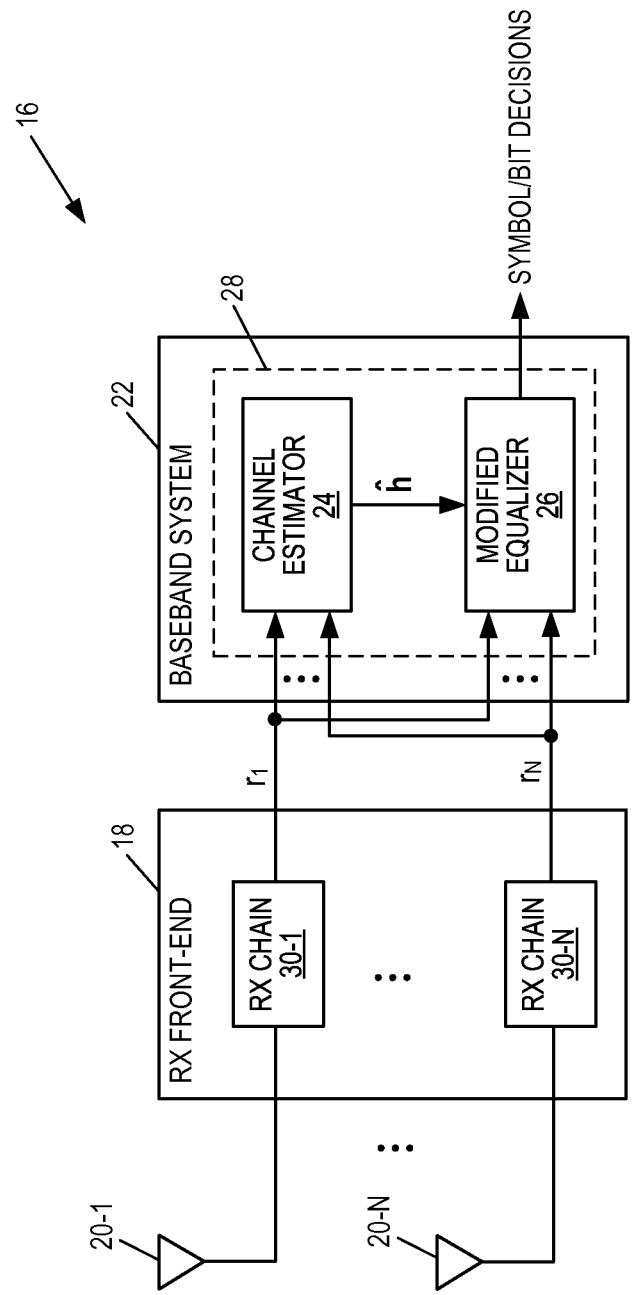
FIG. 2 illustrates a receiver of a wireless node that includes a modified equalizer that implements a channel equalization scheme that accounts for an effective channel estimation error that varies with transmitted symbols according to one embodiment of the present disclosure.

FIG. 2 illustrates a receiver 16 of a wireless node, e.g., the base station 12 or the wireless device 14, according to one embodiment of the present disclosure. As illustrated, the receiver 16 includes a Radio Frequency (RF) Receiver (RX) front-end 18 coupled to antennas 20-1 through 20-N (generally referred to herein collectively as antennas 20 and individually as antenna 20), and a baseband system 22 that includes a channel estimator 24 and a modified equalizer 26 that together form a demodulator 28. While not illustrated, the baseband system 22 may include other components such as, for example, an interleaver, a channel decoder, etc. In one embodiment, the RX front-end 18 includes multiple RF RX chains 30-1 through 30-N (generally referred to herein collectively as RF receiver chains 30 and individually as RF receiver chain 30) coupled to the antennas 20-1 through 20-N, respectively, to enable reception according to a Single Input Multiple Output (SIMO) repetition scheme. The RX front-end 18 includes a number of hardware components (e.g., amplifier(s), filter(s), mixer(s), Analog-to-Digital (A/D) converter(s), etc.) (not shown).

The baseband system 22, and in particular the channel estimator 24 and the modified equalizer 26, are implemented in hardware or any combination of hardware and software. For example, in one particular embodiment, the channel estimator 24 and the modified equalizer 26 are implemented in software stored in a computer readable medium (e.g., a non-transitory computer-readable medium such as, for example, memory) and executed by a processor (e.g., a Central Processing Unit (CPU), a Digital Signal Processor (DSP), or similar hardware processor). However, this is only an example. Other implementations may be used.

The RX front-end 18 receives RF signals from the antennas 20 and processes the RF signals to output samples $r_1$ through $r_N$ of a received signal. The samples of the received signal are then processed by the channel estimator 24 to generate a channel estimate of a channel between the receiver 16 and a transmitter of the received signal. As discussed below in detail, for modulation schemes in which amplitudes of the transmitted symbols vary (e.g., Quadrature Phase Shift Keying (QPSK), 16 Quadrature Amplitude Modulation (16-QAM), etc.), the channel estimate contains an error due to variation in the amplitudes of the transmitted symbols over time. The error in the channel estimate therefore varies with transmitted symbols. As also discussed below in detail, the modified equalizer 26 processes the samples of the received signal according to a modified equalization scheme (e.g., a modified Maximum Likelihood Sequence Estimation (MLSE) scheme) that accounts for variation in an effective channel estimation error with transmitted symbols to thereby provide symbol/bit decisions for the transmitted/received symbols. In this manner, the modified equalizer 26 provides improved performance, particularly in a low Signal-to-Noise (SNR) scenario. While not illustrated, the symbol or bit decisions may then be processed by, e.g., a processor of the wireless node.

Now, the description will turn to the modified equalization scheme performed by the modified equalizer 26. Repetition yields multiple versions of the signal going through different channels, in space, time, or frequency. In the embodiment of FIG. 2, repetition is via reception via the multiple antennas 20. If the channel is highly correlated across repetitions, then channel estimation itself can be improved. However, in the following description, the extreme case where the channel is independent across transmissions is highlighted so there is no benefit for channel estimation from repetition. Nevertheless, overall performance will improve. The general case where the channel is correlated follows naturally in a similar way.

A SIMO system with N receive antennas and Inter-Symbol Interference (ISI) with memory M is assumed. A modulation constellation, or alphabet, Q has a size $q=2^L$. At the transmit side, at time index k, a modulator of the transmitter maps a block of L bits $b_1 \ldots b_L$ into a normalized symbol $s_k$. As used herein, normalized means that a variable has average energy 1, or the components of a vector each have average energy of 1. The ISI channel is modeled as a Finite Impulse Response (FIR) filter with M+1 taps. $h_i=(h_{i1} \ldots h_{iN})^T$, where the superscript indicates a transpose, represents the channel taps to the N antennas at delay i, for $0 \leq i \leq M$. Thus, $h_i$ is referred to herein as the channel at delay i. The received signal r at the receive side at time index k is given by:

$$r_k = h_0 s_k + \ldots + h_M s_{k-M} + v_k \quad (1)$$

where $s_k$ through $s_{k-M}$ are the (normalized) transmitted symbols and $v_k$ is a noise vector, modeled as White (independent components) and Gaussian (WG) with time-invariant covariance $$R_v = N_0 I, \quad (2)$$

where $N_0$ is noise power spectral density. The noise and the channel are assumed to be mutually independent.

Without much loss of generality, a pilot-assisted channel estimation scheme, where the transmitter embeds known pilot symbols in the transmitted signal, is assumed. At the receiver 16, the channel estimation process performed by the channel estimator 24 exploits the known pilot symbols to estimate the channel coefficients. The resulting channel estimate is given by:

$$\hat{h}_i = h_i + e_i \quad (3)$$

where $e_i$ is a channel estimation error vector, for $0 \leq i \leq M$. The statistics of the error coefficients are a function of the particular channel estimation method, as well as the underlying receiver noise. For our purposes, the channel estimation error vector $e_i$ is modeled as complex Gaussian with covariance $R_{e_i}$. In addition, for simplicity, the channel estimation error vectors are assumed to be mutually independent and independent from the noise. Furthermore, the channel estimation error vector $e_i$ is assumed to also be white, and channel estimation is assumed to result in a processing gain $G_i$, relative to the received signal noise level. Then $R_{e_i}$ simplifies to:

$$R_{e_i} = R_v/G_i = (N_0/G_i)I \quad (4)$$

Note that the white noise assumptions for $R_v$ and $R_{e_i}$ will lead to simplified expressions for the modified equalization scheme performed by the modified equalizer 26. However, the modified equalization scheme naturally extends to the case where $R_v$ or $R_{e_i}$ is colored. Also, note that processing gains vary across delays due to the particular channel estimation technique. In A. Khayrallah et al., "Improved channel estimation with side information," IEEE 47th Vehicular Technology Conference, Vol. 2, May 4-7, 1997, Phoenix, Ariz., pages 1049-1053 for instance, side information about the ISI, such as knowledge of the transmit or receive filter, can be used to shape the channel estimation error, which translates into different processing gains in the present context.

Before continuing the description of the modified equalization scheme, a brief discussion of the conventional, or baseline, MLSE equalization scheme is beneficial. The conventional MLSE equalization scheme treats the channel estimates $\hat{h}_i$ as noiseless. In particular, the conventional MLSE equalization scheme uses the Squared Euclidian Distance (SED) as a branch metric. However, the SED branch metric does not account for a modulation effect due to the channel error.

The conventional MLSE equalization scheme operates on a known ISI trellis for memory M, with $q^M$ states and $q^{M+1}$ branches per stage. Each state has a fan-in and a fan-out of size q. The ISI trellis for memory M is referred to herein as an MLSE trellis. Considering the MLSE trellis at stage k, an m-th state in stage k consists of M symbols:

$$s_k^{(m)} = (s_{k-M+1}^{(m)}, \ldots, s_k^{(m)}), \quad (5)$$

where m is an index in the range of 0 to $q^M-1$ for the state $s_k^{(m)}$ within stage k, and $s_{k-M+1}^{(m)}, \ldots, s_k^{(m)}$ are the last M symbols along any path through the MLSE trellis ending at the state $s_k^{(m)}$.

Figure 3:
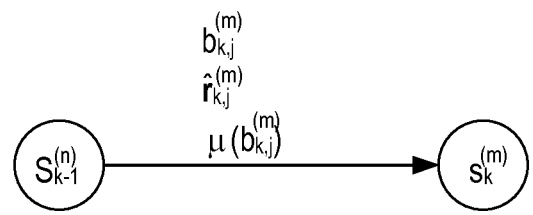
FIG. 3 illustrates a branch in a trellis of a trellis-based equalization scheme.

The state $s_k^{(m)}$ has a corresponding set of q fan-in branches, denoted $I(s_k^{(m)})$. As illustrated in FIG. 3, the set of fan-in branches $I(s_k^{(m)})$ of the state $s_k^{(m)}$ consists of branches $b_k(s_{k-1}^{(n_0)} \to s_k^{(m)})$, $b_k(s_{k-1}^{(n_1)} \to s_k^{(m)})$, ..., $b_k(s_{k-1}^{(n_{q-1})} \to s_k^{(m)})$, where $n_0, n_1, \ldots, n_{q-1}$ are values for the index m for the (k−1)-th stage that correspond to starting states of the fan-in branches $I(s_k^{(m)})$ of the state $s_k^{(m)}$. Note that that the starting state $s_{k-1}^{(n_j)} = (s_{k-M}^{(n_j)}, \ldots, s_{k-1}^{(n_j)})$ of the j-th branch in $I(s_k^{(m)})$ satisfies $s_{k-M+1}^{(n_j)} = s_{k-M+1}^{(m)}, \ldots, s_{k-1}^{(n_j)} = s_{k-1}^{(m)}$, for j=0 ... q−1.

For notational simplicity, the fan-in branches $I(s_k^{(m)})$ of the state $s_k^{(m)}$ are denoted as:

$$\{b_{k,j}^{(m)}\}_{j \in (0 \ldots q-1)} = \{b_k(s_{k-1}^{(n_j)} \to s_k^{(m)})\}_{j \in (0 \ldots q-1)} = I(s_k^{(m)}). \quad (6)$$

where again $n_j$ for j=0 ... q−1 are values for the index m for the (k−1)-th stage that correspond to starting states of the fan-in branches $I(s_k^{(m)})$ of the state $s_k^{(m)}$.

Also associated with each fan-in branch $b_{k,j}^{(m)}$ for the state $s_k^{(m)}$ is a synthesized received value:

$$\hat{r}_{k,j}^{(m)}(b_{k,j}^{(m)}) = \hat{h}_0 s_{k,j}^{(m)} + \ldots + \hat{h}_M s_{k-M,j}^{(m)} \quad (7)$$

and the branch metric for the conventional MLSE equalization scheme is given by the SED:

$$\mu(b_{k,j}^{(m)}) = \|r_k - \hat{r}_{k,j}^{(m)}(b_{k,j}^{(m)})\|^2. \quad (8)$$

Figure 4:
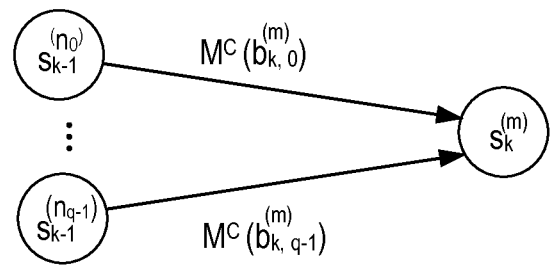
FIG. 4 illustrates a number of fan-in branches for a state in a trellis of a trellis-based equalization scheme.

State metrics are computed sequentially, stage by stage, based on the branch metric. More specifically, as illustrated in FIG. 4 with respect to the state $s_k^{(m)}$ at stage k for example, the state $s_k^{(m)}$ has q fan-in branches $$\{b_{k,j}^{(m)}\}_{j\in(0...q-1)},$$

as discussed above. For each j-th fan-in branch $b_{k,j}^{(m)}$ of the state $s_k^{(m)}$, a candidate state metric $M^c(b_{k,j}^{(m)})$ for the fan-in branch is computed by adding the branch metric $\mu(b_{k,j}^{(m)})$ for the state $s_k^{(m)}$ to a state metric $M(s_{k-1}^{(n)})$ of the starting state of the j-th fan-in branch $b_{k,j}^{(m)}$. Thus, the candidate state metric $M^c(b_{k,j}^{(m)})$ can be expressed as:

$$M^c(b_{k,j}^{(m)}) = M(s_{k-1}^{(n)}) + \mu(b_{k,j}^{(m)}). \quad (9)$$

The state metric $M(s_k^{(m)})$ for state $s_k^{(m)}$ is found by comparing the candidate metrics of the q fan-in branches of the state $s_k^{(m)}$:

$$M(s_k^{(m)}) = \min_{b_{k,j}^{(m)} \in I(s_k^{(m)})} M^C(b_{k,j}^{(m)}). \quad (10)$$

The branch $b_{k,j}^{(m)}$ that achieves the minimum is attached to the state $s_k^{(m)}$. The other branches in $I(s_k^{(m)})$ can be discarded.

Without much loss of generality, the conventional MLSE equalizer is assumed to operate on a burst with known symbols at both ends. So, the MLSE trellis terminates in known start and end states. The state metrics at index 0, before processing the first received vector $r_0$, are set to infinity, except for the known start state, whose metric is set to 0. After completion of the burst, the equalizer traces back along the best path from its end state to its start state, and outputs the corresponding symbol decisions.

The conventional MLSE equalization scheme discussed above does not account for effective channel estimation error. In particular, looking at the j-th fan-in branch $b_{k,j}^{(m)} = b_k(s_{k-1}^{(nj)} \to s_k^{(m)})$, the associated symbols $s_{k,j}^{(m)} = (s_{k-M,j}^{(m)}, \ldots, s_{k,j}^{(m)}) = (s_{k-M}^{(nj)}, \ldots s_{k-1}^{(nj)}, s_k^{(m)})$ are assumed to be correct, meaning that the associated symbols coincide with the ones that were transmitted. Under this assumption, the channel estimation error for the j-th fan-in branch $b_{k,j}^{(m)}$ of the state $s_k^{(m)}$ shows up in the branch metric difference as follows:

$$r_k - \hat{r}_{k,j}^{(m)}(b_{k,j}^{(m)}) = r_k - \left(h_0 s_{k,j}^{(m)} + \ldots + h_M s_{k-M,j}^{(m)}\right) - \quad (11)$$
$$(e_0 s_{k,j}^{(m)} + \ldots + e_M s_{k-M,j}^{(m)})$$
$$= v_k - (e_0 s_{k,j}^{(m)} + \ldots + e_M s_{k-M,j}^{(m)})$$
$$\stackrel{def}{=} w_k$$

The term $w_k$ can be interpreted as an estimate of the effective error of channel estimation, conditioned on the j-th fan-in branch $b_{k,j}^{(m)}$.

We assume that $w_k$ is a complex Gaussian vector with zero mean and covariance $R_w$, which we derive from Equation (11) next. We can write the probability density of $w_k$, expressed in log form for convenience, as:

$$\ln P(w_k) = -w_k^H R_w^{-1} w_k - \ln(\det(R_w)) - N \ln \pi. \quad (12)$$

where the superscript H indicates the Hermitian operator. From the second line in Equation (11), and the mutual independence of $v_k$ and $e_i$, $R_w$ can be written as:

$$R_w = R_v + |s_{k-M,j}^{(m)}|^2 R_{e_M} + \ldots + |s_{k,j}^{(m)}|^2 R_{e_0} \quad (13)$$
$$= \left(1 + \frac{|s_{k-M,j}^{(m)}|^2}{G_M} + \ldots + \frac{|s_{k,j}^{(m)}|^2}{G_0}\right) N_0 I$$
$$= \beta(b_{k,j}^{(m)}) N_0 I$$

where the second equality in Equation (13) follows from Equation (4). Also, the term $$\beta(b_{k,j}^{(m)}) = 1 + \frac{|s_{k-M,j}^{(m)}|^2}{G_M} + \ldots + \frac{|s_{k,j}^{(m)}|^2}{G_0} \quad (14)$$

captures the modulation effect of the symbols $(s_{k-M,j}^{(m)}, \ldots, s_{k,j}^{(m)})$ associated with branch $b_{k,j}^{(m)}$ on the effective error covariance $R_w$. Using the last line in Equation (13), we can express the probability density of $w_k$ as follows:

$$\ln P(w_k) = -N_0^{-1}(\beta(b_k))^{-1}\|w_k\|^2 - N \ln(\beta(b_k)) - N \ln N_0 - N \ln \pi \quad (15)$$

Based on the above analysis, we can see that the baseline MLSE equalization scheme does not account for the fact that the effective covariance $R_w$ varies with the branch $b_{k,j}^{(m)}$. If the symbol constellation has constant magnitude symbols (e.g., as in Binary Phase Shift Keying (BPSK) or QPSK), then there is no variation of the effective covariance $R_w$ because the magnitude of the transmitted symbols do not vary (i.e., $\beta(b_{k,j}^{(m)})$ is the same for all combinations of transmitted symbols). However, for a constellation with variable magnitude symbols (e.g., Quadrature Amplitude Modulation (QAM)), the effective covariance $R_w$ varies with the branch $b_{k,j}^{(m)}$ according to the term $\beta(b_{k,j}^{(m)})$ defined above.

As discussed below, the modified equalizer 26 operates according to a modified equalization scheme (e.g., a modified MLSE equalization scheme) that takes into account the variation of the effective covariance $R_w$ with the branch $b_{k,j}^{(m)}$ to thereby improve the performance of the receiver 16. This is particularly beneficial in low SNR scenarios with noisy Channel State Information (CSI) because, as the channel estimation quality improves relative to the received signal noise level, the modulation effect is diminished. The improvement in channel estimation quality (i.e., less noisy CSI) is reflected in larger processing gains $G_i$, which drive $\beta(b_k)$ closer to 1.

Figure 5:
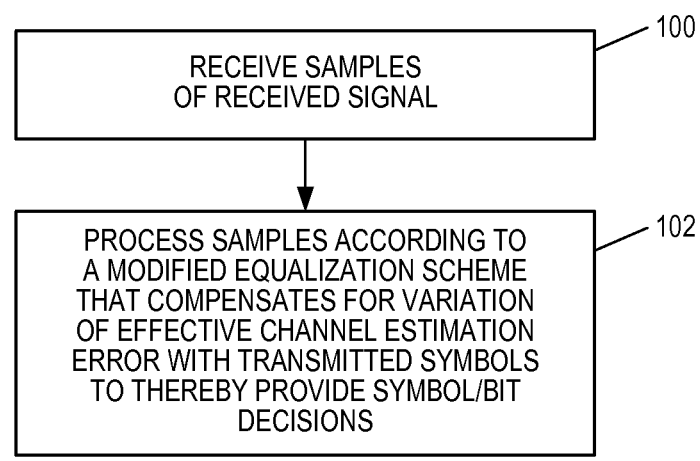
FIG. 5 is a flow chart that illustrates the operation of the modified equalizer of FIG. 2 according to one embodiment of the present disclosure.

More specifically, FIG. 5 is a flow chart that illustrates the operation of the modified equalizer 26 according to one embodiment of the present disclosure. As illustrated, the modified equalizer 26 receives samples of the received signal (step 100). The modified equalizer 26 processes the samples of the received signal according to a modified equalization scheme that compensates for, or takes into account, variation in an effective channel estimation error with transmitted symbols to thereby provide corresponding bit or symbol decisions (step 102). In one embodiment, the modified equalization scheme is a modified MLSE equalization scheme. In another embodiment, the modified equalization scheme is a modified Decision Feedback Sequence Estimation (DFSE) equalization scheme.

While the modified equalization scheme can compensate, or account, for the variation in the effective channel estimation error with transmitted symbols in any suitable manner, in one embodiment, the modified equalization scheme does so by utilizing a modified branch metric. This modified branch metric can be used in any suitable trellis-based equalization scheme such as, for example, a modified (full) MLSE equalization scheme or variants (e.g., simplifications) of the modified MLSE equalization scheme such as, e.g., a modified DFSE equalization scheme. These trellis-based equalization schemes may also be referred to as non-linear equalization schemes. In some embodiments, other than using the modified branch metric, the modified equalization scheme proceeds in the same manner as the corresponding conventional equalization scheme.

In order to develop the modified, or new, branch metric that reflects the modulation effect on the effective error covariance, we look first at MLSE. Given the channel estimates, we consider the probability of the received signal $r_k$, conditioned on the branch $b_{k,j}^{(m)}$. Recall that knowledge of the branch $b_{k,j}^{(m)}$ means knowledge of its associated symbols $(s_{k-M,j}^{(m)}, \ldots, s_{k,j}^{(m)})$, so we can form the synthesized received value $\hat{r}_{k,j}^{(m)}(b_{k,j}^{(m)})$. From Equation (11), we have $r_k - \hat{r}_{k,j}^{(m)}(b_{k,j}^{(m)}) = w_k$, so we can use the probability of $w_k$ in Equation (12) to write:

$$\ln P(r_k \mid b_{k,j}^{(m)}) = -(r_k - \hat{r}_{k,j}^{(m)}(b_{k,j}^{(m)}))^H R_w^{-1}(r_k - \hat{r}_{k,j}^{(m)}(b_{k,j}^{(m)})) - \quad (16)$$
$$\ln(\det(R_w)) - N\ln\pi$$
$$= -N_0^{-1}(\beta(b_{k,j}^{(m)}))^{-1} \|r_k - \hat{r}_{k,j}^{(m)}(b_{k,j}^{(m)})\|^2 -$$
$$N\ln(\beta(b_{k,j}^{(m)})) - N\ln N_0 - N\ln\pi$$

where the second equality follows from Equation (15). Multiplying by $-N_0$ and dropping constant terms, we obtain the modified, or new, branch metric for the branch $b_{k,j}^{(m)}$:

$$\mu_{new}(b_{k,j}^{(m)}) = (\beta(b_{k,j}^{(m)}))^{-1} \|r_k - \hat{r}_{k,j}^{(m)}(b_{k,j}^{(m)})\|^2 + NN_0 \ln(\beta(b_{k,j}^{(m)})) \quad (17)$$

From Equation (17), it is clearly shown that the conventional SED branch metric $\mu(b_{k,j}^{(m)})$ (see Equation (8)) is modified by $\beta(b_{k,j}^{(m)})$.

In the description above, in many instances, a white noise assumption is made. The white noise assumption is reasonable, as it reduces the number of off-diagonal elements that need to be estimated in the noise covariance $R_v$ as well as the error covariances $R_{e_j}$. Also, the diagonal matrices that result from the white noise assumption result in a simplified expression for $R_w$ and finally the new branch metric $\mu_{new}(b_{k,j}^{(m)})$. In addition, the modulation effect is captured nicely in $\beta(b_{k,j}^{(m)})$ in Equation (14). Nevertheless, if a colored noise model is a better fit for either the noise or the error, then it may be beneficial to incorporate this color at the price of higher complexity. The new branch metric $\mu_{new}(b_{k,j}^{(m)})$ extends naturally to this case. Specifically, the first line in Equation (13) gives the general expression for $R_w$, without any restriction on $R_v$ or $R_{e_j}$, still showing the modulation effect of the symbol magnitudes. Also, the first line in Equation (16) gives the general expression for $$\ln P(r_k \mid b_{k,j}^{(m)}),$$

which can be turned into a general expression for $\mu_{new}(b_{k,j}^{(m)})$ by switching signs and removing the constant term:

$$\mu_{new}(b_{k,j}^{(m)}) = (r_k - \hat{r}_{k,j}^{(m)}(b_{k,j}^{(m)}))^H R_w^{-1}(r_k - \hat{r}_{k,j}^{(m)}(b_{k,j}^{(m)})) + \ln(\det(R_w)) \quad (18)$$

The complexity increase is dominated by the matrix inverse, for a large number of antennas.

When using the new branch metric $\mu_{new}(b_{k,j}^{(m)})$, in some embodiments, the rest of the equalization scheme is the same as before. For example, for MLSE, the modified MLSE scheme utilizes the new branch metric $\mu_{new}(b_{k,j}^{(m)})$ but is otherwise the same as the conventional MLSE scheme. Note that the effect of $\beta(b_{k,j}^{(m)})$ will permeate the whole MLSE trellis, starting with the candidate state metric comparison of two branches with different values of $\beta(b_{k,j}^{(m)})$ and belonging to the same state fan-in. Also, note that the number of receive antennas N amplifies the impact of $\beta(b_{k,j}^{(m)})$ on $\mu_{new}(b_{k,j}^{(m)})$. Thus, the benefit of the new equalizer is more pronounced for larger numbers of antennas. Also, as discussed before, improving channel quality drives $\beta(b_k)$ closer to 1, which in turn brings the new branch metric $\mu_{new}(b_{k,j}^{(m)})$ closer to the conventional SED branch metric $\mu(b_{k,j}^{(m)})$.

Figure 6:
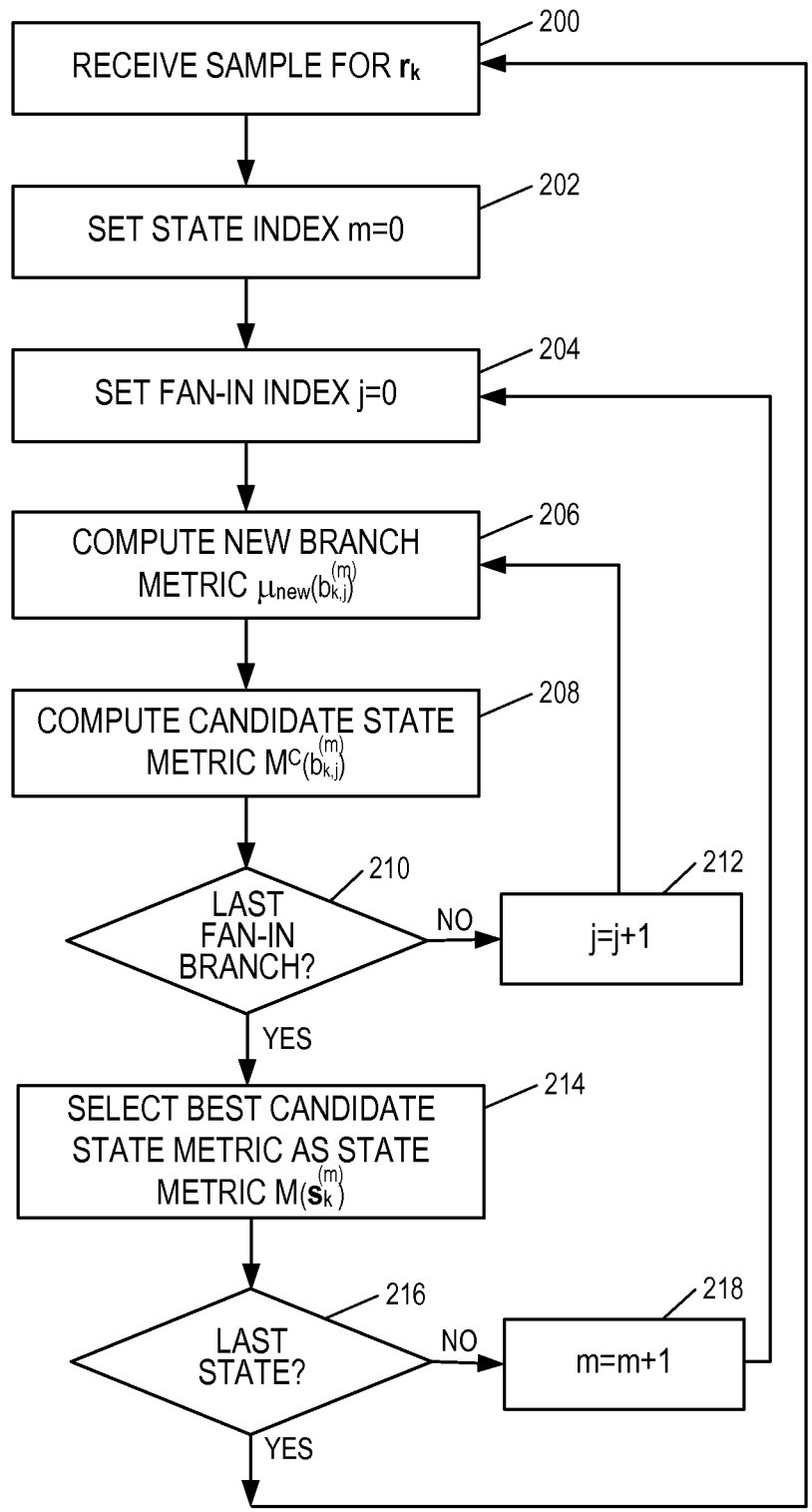
FIG. 6 is a flow chart that illustrates the operation of the modified equalizer of FIG. 2 according to another embodiment of the present disclosure.

FIG. 6 is a flow chart that illustrates the operation of the modified equalizer 26 according to another embodiment of the present disclosure. In this embodiment, the modified equalization scheme is a modified MLSE equalization scheme that utilizes the new branch metric $\mu_{new}(b_{k,j}^{(m)})$. As illustrated, the modified equalizer 26 receives a sample of the received signal $r_k$ at time k (step 200). The modified equalizer 26 sets the state index m equal to 0 and sets the fan-in branch index j for the state $s_k^{(m)}$ equal to 0 (steps 202 and 204). The modified equalizer 26 then computes the new branch metric $\mu_{new}(b_{k,j}^{(m)})$ for the fan-in branch $b_{k,j}^{(m)}$ of the state $s_k^{(m)}$, which for this first iteration is $\mu_{new}(b_{k,0}^{(0)})$ (step 206). Note that, in one embodiment, the complexity of the computation of the new branch metric $\mu_{new}(b_{k,j}^{(m)})$ may be reduced by storing a number of pre-computed values. For example, for a given modulation constellation, there is a limited number of distinct symbol absolute values (i.e., magnitudes). Thus, in one embodiment, a table of pre-computed values for $\beta(b_k)$ is stored and utilized when computing the new branch metric $\mu_{new}(b_{k,j}^{(m)})$, given the knowledge of the processing gains $G_i$, $0 \le i \le M$. Further, in some particular implementations, the processing gains are the same, i.e., $G_0 = \ldots = G_M$, simplifying the table further.

In addition, the modified equalizer 26 computes the candidate state metric $M^c(b_{k,j}^{(m)})$ for the fan-in branch $b_{k,j}^{(m)}$ of the state $s_k^{(m)}$ based on the new branch metric $\mu_{new}(b_{k,j}^{(m)})$ (step 208). The modified equalizer 26 then determines whether the last fan-in branch $b_{k,j}^{(m)}$ of the state $s_k^{(m)}$ has been processed (step 210). If not, the modified equalizer 26 increments the fan-in branch index j (step 212), and the process returns to step 206 and is repeated for the next fan-in branch $b_{k,j}^{(m)}$ of the state $s_k^{(m)}$. Once the last fan-in branch $b_{k,j}^{(m)}$ of the state $s_k^{(m)}$ has been processed, the modified equalizer 26 selects the best candidate state metric $M^c(b_{k,j}^{(m)})$ for the fan-in branch $b_{k,j}^{(m)}$ of the state $s_k^{(m)}$ as the state metric $M(s_k^{(m)})$ for the state $s_k^{(m)}$ (step 214). The corresponding fan-in branch $b_{k,j}^{(m)}$ is attached to the state $s_k^{(m)}$ such that the symbols $(s_{k-M+1,j}^{(m)}, \ldots, s_{k,j}^{(m)})$ associated with that fan-in branch $b_{k,j}^{(m)}$ are stored as the symbols $(s_{k-M+1}^{(m)}, \ldots, s_k^{(m)})$ for the state $s_k^{(m)}$). The modified equalizer 26 determines whether the last state in stage k has been processed (step 216). If not, the modified equalizer 26 increments the state index m (step 218), and the process returns to step 204 and is repeated for the next state $s_k^{(m)}$. Once the last state $s_k^{(m)}$ has been processed, the modified equalizer 26 returns to step 200 and repeats the process for the next sample of the received signal $r_k$.

Note that while the flow chart of FIG. 6 illustrates the states $s_k^{(m)}$ being processed in a sequential order, the modified MLSE equalization scheme is not limited thereto. For instance, the modified equalizer 26 may process the states $s_k^{(m)}$ in any desired order. Further, the modified equalizer 26 may process all of the states or groups of the states $s_k^{(m)}$ in parallel. Thus, for example, the modified equalizer 26 may process all of the states $s_k^{(m)}$ at the same time.

In the embodiment of FIG. 6, the modified equalization scheme is a modified MLSE equalization scheme that utilizes the new branch metric $\mu_{new}(b_{k,j}^{(m)})$. However, as discussed above, the present disclosure is not limited to a modified MLSE equalization scheme. For example, the present disclosure is also applicable to a modified DFSE equalization scheme that utilizes the new branch metric $\mu_{new}(b_{k,j}^{(m)})$. As known to one of ordinary skill in the art, the DFSE equalization scheme uses a reduced trellis based on a memory M'<M, even though the ISI memory remains M. More specifically, only M'+1 symbols $(s_{k-M',j}^{(m)}, \ldots, s_{k,j}^{(m)})$ are now associated with the fan-in branch $b_{k,j}^{(m)}$. However, all M+1 symbols $(s_{k-M,j}^{(m)}, \ldots, s_{k,j}^{(m)})$ are needed to compute $\hat{r}_{k,j}^{(m)}(b_{k,j}^{(m)})$. In order to procure the remaining M−M' symbols, the DFSE scheme traces back along the best path ending in the start state of the fan-in branch $b_{k,j}^{(m)}$. In the baseline, or conventional, DFSE equalization scheme, the SED branch metric $\mu(b_{k,j}^{(m)})$ is used, and the rest of the operations follow as in the MLSE equalization scheme. However, in one embodiment, a modified DFSE equalization scheme utilizes the new branch metric $\mu_{new}(b_{k,j}^{(m)})$ instead of the SED branch metric $\mu(b_{k,j}^{(m)})$ to thereby account for variation in the effective channel estimation noise with transmitted symbols, as discussed above.

Note that the embodiments described above focus on equalization for the ISI channel. However, the concepts disclosed herein, and in particular the new branch metric $\mu_{new}(b_{k,j}^{(m)})$, extends naturally to any trellis. For example, trellis coded modulation requires a trellis at the receiver that accounts for trellis-based modulation at the transmitter, in the absence of ISI. With ISI, the trellis at the receiver is augmented to represent both the trellis-based modulation at the transmitter and the ISI (which also includes the effects of transmit and receive filters, etc.). The conventional MLSE equalization scheme can operate on that trellis using the same steps as before, starting with the SED as the branch metric. One example of trellis coded modulation is discussed in G. Ungerboeck, "Channel coding with multilevel/phase signals," IEEE Trans. Info. Theory, Vol. 28, No. 1, January 1982, pages 55-67. The modified equalization scheme (e.g., the modified MLSE equalization scheme using the new branch metric $\mu_{new}(b_{k,j}^{(m)})$) can operate on the trellis in the same way to provide improved performance.

The following acronyms are used throughout this disclosure.

16-QAM 16 Quadrature Amplitude Modulation
3GPP 3rd Generation Partnership Project
A/D Analog-to-Digital
BPSK Binary Phase Shift Keying
CDMA Code Division Multiple Access
CPU Central Processing Unit
CSI Channel State Information
dB Decibel
DFSE Decision Feedback Sequence Estimation
DSP Digital Signal Processor
eNB Evolved or Enhanced Node B
FIR Finite Impulse Response
ISI Inter-Symbol Interference
KHz Kilohertz
LTE Long Term Evolution
MLSE Maximum Likelihood Sequence Estimation
MTC Machine Type Communication
OFDM Orthogonal Frequency Division Multiplexing
QAM Quadrature Amplitude Modulation
QPSK Quadrature Phase Shift Keying
RAN Radio Access Network
RF Radio Frequency
RX Receiver
SED Squared Euclidian Distance
SIMO Single Input Multiple Output
SNR Signal-to-Noise
UE User Equipment
WG White and Gaussian Those skilled in the art will recognize improvements and modifications to the embodiments of the present disclosure. All such improvements and modifications are considered within the scope of the concepts disclosed herein and the claims that follow.

What is claimed is:

1. A wireless node comprising:
   a receiver front-end adapted to output samples of a received signal;
   a channel estimator adapted to estimate a channel between a transmitter of the received signal and the wireless node based on the samples of the received signal; and
   an equalizer adapted to process the samples of the received signal according to an equalization scheme that compensates for variation in an effective channel estimation error with transmitted symbols to thereby provide corresponding bit or symbol decisions, the variation being variation in the effective channel estimation error with transmitted symbols.

2. The wireless node of claim 1 wherein the equalization scheme is a modified Maximum Likelihood Sequence Estimation, MLSE, scheme.

3. The wireless node of claim 1 wherein the equalization scheme is a modified Decision Feedback Sequence Estimation, DFSE, scheme.

4. The wireless node of claim 1 wherein the equalization scheme is a trellis-based equalization scheme that utilizes a trellis and a branch metric that takes into account the variation in the effective channel estimation error with transmitted symbols.

5. The wireless node of claim 4 wherein the branch metric is defined as:

$$\mu_{new}(b_{k,j}^{(m)}) = \left(r_k - \hat{r}_{k,j}^{(m)}(b_{k,j}^{(m)})\right)^H R_w^{-1} \left(r_k - \hat{r}_{k,j}^{(m)}(b_{k,j}^{(m)})\right) + \ln(\det(R_w))$$

where $b_{k,j}^{(m)}$ is a j-th fan-in branch of an m-th state $s_k^{(m)}$ in a k-th stage of the trellis, $\mu_{new}(b_{k,j}^{(m)})$ is the branch metric for the branch $b_{k,j}^{(m)}$ in the trellis, $r_k$ is the received signal at time k, $\hat{r}_{k,j}^{(m)}(b_{k,j}^{(m)})$ is a synthesized receive value for the branch $b_{k,j}^{(m)}$, H denotes the Hermitian transpose, and $R_w$ is a covariance of the effective channel estimation error with transmitted symbols conditioned on the branch $b_{k,j}^{(m)}$.

6. The wireless node of claim 4 wherein the branch metric is defined as:

$$\mu_{new}(b_{k,j}^{(m)}) = (\beta(b_{k,j}^{(m)}))^{-1}\|r_k - \hat{r}_{k,j}^{(m)}(b_{k,j}^{(m)})\|^2 + NN_0\ln(\beta(b_{k,j}^{(m)}))$$

where $b_{k,j}^{(m)}$ is a j-th fan-in branch of an m-th state $s_k^{(m)}$ in a k-th stage of the trellis, $\mu_{new}(b_{k,j}^{(m)})$ is the branch metric for the branch $b_{k,j}^{(m)}$ in the trellis, $r_k$ is the received signal at time k, $\hat{r}_{k,j}^{(m)}(b_{k,j}^{(m)})$ is a synthesized receive value for the branch $b_{k,j}^{(m)}$, and $\beta(b_{k,j}^{(m)})$ is a term that captures a modulation effect of symbols associated with the branch $b_{k,j}^{(m)}$ on a covariance of the effective channel estimation error with transmitted symbols conditioned on the branch $b_{k,j}^{(m)}$.

7. The wireless node of claim 6 wherein the trellis-based equalization scheme is a modified Maximum Likelihood Sequence Estimation, MLSE, scheme.

8. The wireless node of claim 7 wherein the equalizer is adapted to process the samples of the received signal according to the equalization scheme by, for each time k in a range of 1 to M where M is a memory depth of the modified MLSE scheme:
for each state $s_k^{(m)}$ in the k-th stage of the trellis:
computing a plurality of branch metrics $\mu_{new}(b_{k,j}^{(m)})$ for a plurality of fan-in branches $b_{k,j}^{(m)}$ of the state $s_k^{(m)}$ in the k-th stage of the trellis;
computing a plurality of candidate state metrics for the plurality of fan-in branches $b_{k,j}^{(m)}$ of the state $s_k^{(m)}$ in the k-th stage of the trellis; and
selecting a best candidate state metric from the plurality of candidate state metrics for the plurality of fan-in branches $b_{k,j}^{(m)}$ of the state $s_k^{(m)}$ in the k-th stage of the trellis as a state metric for the state $s_k^{(m)}$ in the k-th stage of the trellis.

9. The wireless node of claim 6 wherein the trellis-based equalization scheme is a modified Decision Feedback Sequence Estimation, DFSE, scheme.

10. The wireless node of claim 6 wherein the trellis-based equalization scheme is a modified Maximum Likelihood Sequence Estimation, MLSE, scheme, and the trellis is a trellis that accounts for trellis coded modulation at the transmitter and channel inter-symbol interference.

11. A method of operation of a wireless node, comprising:
providing samples of a received signal;
estimating a channel between a transmitter of the received signal and the wireless node based on the samples of the received signal; and
processing the samples of the received signal according to an equalization scheme that compensates for variation in an effective channel estimation error with transmitted symbols to thereby provide corresponding bit or symbol decisions, the variation being variation in the effective channel estimation error with transmitted symbols.

12. The method of claim 11 wherein the equalization scheme is a modified Maximum Likelihood Sequence Estimation, MLSE, scheme.

13. The method of claim 11 wherein the equalization scheme is a modified Decision Feedback Sequence Estimation, DFSE, scheme.

14. The method of claim 11 wherein the equalization scheme is a trellis-based equalization scheme that utilizes a trellis and a branch metric that takes into account the variation in the effective channel estimation error with transmitted symbols.

15. The method of claim 14 wherein the branch metric is defined as:

$$\mu_{new}(b_{k,j}^{(m)}) = (r_k - \hat{r}_{k,j}^{(m)}(b_{k,j}^{(m)}))^H R_w^{-1}(r_k - \hat{r}_{k,j}^{(m)}(b_{k,j}^{(m)})) + \ln(\det(R_w))$$

where $b_{k,j}^{(m)}$ is a j-th fan-in branch of an m-th state $s_k^{(m)}$ in a k-th stage of the trellis, $\mu_{new}(b_{k,j}^{(m)})$ is the branch metric for the branch $b_{k,j}^{(m)}$ in the trellis, $r_k$ is the received signal at time k, $\hat{r}_{k,j}^{(m)}(b_{k,j}^{(m)})$ is a synthesized receive value for the branch $b_{k,j}^{(m)}$, H denotes the Hermitian transpose, and $R_w$ is a covariance of the effective channel estimation error with transmitted symbols conditioned on the branch $b_{k,j}^{(m)}$.

16. The method of claim 14 wherein the branch metric is defined as:

$$\mu_{new}(b_{k,j}^{(m)}) = (\beta(b_{k,j}^{(m)}))^{-1}\|r_k - \hat{r}_{k,j}^{(m)}(b_{k,j}^{(m)})\|^2 + NN_0\ln(\beta(b_{k,j}^{(m)}))$$

where $b_{k,j}^{(m)}$ is a j-th fan-in branch of an m-th state $s_k^{(m)}$ in a k-th stage of the trellis, $\mu_{new}(b_{k,j}^{(m)})$ is the branch metric for the branch $b_{k,j}^{(m)}$ in the trellis, $r_k$ is the received signal at time k, $\hat{r}_{k,j}^{(m)}(b_{k,j}^{(m)})$ is a synthesized receive value for the branch $b_{k,j}^{(m)}$, and $\beta(b_{k,j}^{(m)})$ is a term that captures a modulation effect of symbols associated with the branch $b_{k,j}^{(m)}$ on a covariance of the effective channel estimation error with transmitted symbols conditioned on the branch $b_{k,j}^{(m)}$.

17. The method of claim 16 wherein the trellis-based equalization scheme is a modified Maximum Likelihood Sequence Estimation, MLSE, scheme.

18. The method of claim 17 wherein processing the samples of the received signal according to the equalization scheme comprises, for each time k in a range of 1 to M where M is a memory depth of the modified MLSE scheme:
for each state $s_k^{(m)}$ in the k-th stage of the trellis:
computing a plurality of branch metrics $\mu_{new}(b_{k,j}^{(m)})$ for a plurality of fan-in branches $b_{k,j}^{(m)}$ of the state $s_k^{(m)}$ in the k-th stage of the trellis;
computing a plurality of candidate state metrics for the plurality of fan-in branches $b_{k,j}^{(m)}$ of the state $s_k^{(m)}$ in the k-th stage of the trellis; and
selecting a best candidate state metric from the plurality of candidate state metrics for the plurality of fan-in branches $b_{k,j}^{(m)}$ of the state $s_k^{(m)}$ in the k-th stage of the trellis as a state metric for the state $s_k^{(m)}$ in the k-th stage of the trellis.

19. The method of claim 16 wherein the trellis-based equalization scheme is a modified Decision Feedback Sequence Estimation, DFSE, scheme.

20. The method of claim 16 wherein the trellis-based equalization scheme is a modified Maximum Likelihood Sequence Estimation, MLSE, scheme, and the trellis is a trellis that accounts for trellis coded modulation at the transmitter and channel inter-symbol interference.

* * * * *